(12) United States Patent
Schmitt et al.

(10) Patent No.: US 11,007,744 B2
(45) Date of Patent: May 18, 2021

(54) SHAPE-OPTIMIZED PM TOOL COMPONENTS USING CONNECTION TECHNOLOGY

(71) Applicant: GKN Sinter Metals Engineering GmbH, Radevormwald (DE)

(72) Inventors: Rainer Schmitt, Wachtberg (DE); Hasim Tekines, Wachtberg (DE); Christian Siegert, Ahrweiler (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 592 days.

(21) Appl. No.: 15/547,613

(22) PCT Filed: Jan. 29, 2016

(86) PCT No.: PCT/EP2016/051938
§ 371 (c)(1),
(2) Date: Jul. 31, 2017

(87) PCT Pub. No.: WO2016/124498
PCT Pub. Date: Aug. 11, 2016

(65) Prior Publication Data
US 2018/0015680 A1 Jan. 18, 2018

(30) Foreign Application Priority Data
Feb. 2, 2015 (DE) .................... 10 2015 201 784.2

(51) Int. Cl.
*B30B 11/02* (2006.01)
*B30B 15/06* (2006.01)
(Continued)

(52) U.S. Cl.
CPC .............. *B30B 15/065* (2013.01); *B22F 3/03* (2013.01); *B30B 11/02* (2013.01); *B30B 15/026* (2013.01);
(Continued)

(58) Field of Classification Search
CPC .......... B30B 1/18; B30B 11/02; B30B 15/00; B30B 15/026; B30B 15/06; B30B 15/062; B29C 43/32
See application file for complete search history.

(56) References Cited

U.S. PATENT DOCUMENTS 5,238,375 A  8/1993  Hirai
8,657,594 B2 * 2/2014  Atagi ..................... B30B 11/08
                                                    425/345
(Continued)

FOREIGN PATENT DOCUMENTS

DE  3241383 A1  5/1984
DE  4203572 A1  11/1992
(Continued)

OTHER PUBLICATIONS

The State Intellectual Property Office of People's Republic of China, First Office Action and Search Report, Application No. 201680008340.6, dated Sep. 14, 2018, 17 pages.
(Continued)

*Primary Examiner* — Thu Khanh T Nguyen
(74) *Attorney, Agent, or Firm* — Quarles & Brady LLP (57) ABSTRACT

The present invention relates to a punch unit of a powder press, wherein the punch unit is assembled from at least two parts, in this case comprising a headpiece as the first part and a widening region, adjoining the headpiece, as the second part, wherein the widening region flares to a diameter of a punch bolder which is directly attachable to an end, located away from the headpiece, of the widening region. Furthermore, punch units of a powder press that slide one inside another, a powder press itself and a method for operating a powder press are proposed.

19 Claims, 5 Drawing Sheets

(51) Int. Cl.
  *B22F 3/03*   (2006.01)
  *B30B 15/02*  (2006.01)
  *B33Y 80/00*  (2015.01)
  *B22F 10/00*  (2021.01)

(52) U.S. Cl.
  CPC .............. *B33Y 80/00* (2014.12); *B22F 10/00* (2021.01); *B22F 2999/00* (2013.01); *Y02P 10/25* (2015.11)

(56) References Cited

U.S. PATENT DOCUMENTS

| | | | |
|---|---|---|---|
| 9,272,443 B2* | 3/2016 | Menzel | B30B 1/18 |
| 2007/0062244 A1* | 3/2007 | Good | B30B 11/02 |
| | | | 72/413 |
| 2007/0062248 A1 | 3/2007 | Solty et al. | |
| 2007/0087073 A1* | 4/2007 | Chowdhury | B29C 43/08 |
| | | | 425/408 |
| 2013/0313741 A1 | 11/2013 | Menzel et al. | |
| 2017/0087638 A1* | 3/2017 | Schmitt | B30B 11/02 |

FOREIGN PATENT DOCUMENTS

| | | | | |
|---|---|---|---|---|
| DE | 102014003726 A1 * | 9/2015 | ............. | B30B 11/02 |
| DE | 102014003726 A1 | 9/2015 | | |
| EP | 1764173 A2 * | 3/2007 | ................ | B22F 3/03 |
| EP | 1764173 A2 | 3/2007 | | |
| GB | 2129724 A | 5/1984 | | |
| JP | 2004291046 A | 10/2004 | | |
| WO | 0112367 A2 | 2/2001 | | |

OTHER PUBLICATIONS

The State Intellectual Property Office of People's Republic of China, Second Office Action, Application No. 201680008340.6, dated May 5, 2019, 15 pages.
PCT International Search Report, PCT/EP2016/051938, dated May 9, 2016, 7 pages.
PCT Written Opinion, PCT/EP2016/051938, dated May 9, 2016, 13 pages.
The State Intellectual Property Office of People'S Republic of China, Fourth Office Action and Search Report, Application No. 201680008340.6, dated Nov. 13, 2020, 15 pages.

* cited by examiner

PRIOR ART

Fig. 15

SHAPE-OPTIMIZED PM TOOL COMPONENTS USING CONNECTION TECHNOLOGY

This application represents the U.S. national stage entry of International Application No. PCT/EP2016/051938 filed Jan. 29, 2016, which claims priority to German Patent Application No. 10 2015 201 784.2 filed Feb. 2, 2015, the disclosure of which is incorporated herein by reference in its entirety and for all purposes.

The present invention relates to a punch unit of a powder press and punch units of a powder press that slide in one another. Also proposed are a powder press and a method for operating the powder press, in particular when using metallic powders which, for example, still have to be sintered or otherwise heated.

DE 10 2014 003 726 of the applicant describes building up tool elements of a powder press by means, for example, of the additive method of laser sintering. The punch which emerges there widens from a first end, the headpiece, as far as the second end, the foot area, in such a way that the second end corresponds to the diameter of the punch holder and can hold further punches or combinations of punch headpiece and shape-optimized extensions in the interior of the second end.

As described in DE 10 2014 003 726, such punches are produced in one piece. The additive fabrication methods used here are, however, relatively poor in terms of their maintenance of tolerance. This means that the high requirements on the precision of the headpieces are not feasible without re-working. This also applies to foot pieces, which primarily require small evennesses and rectangularities in the contact surface and close parallelisms in the clamping regions. Here, too, material-removing re-working is required.

The single-piece shape of the punch unit can have the disadvantage that the necessary hard machining of the headpiece is difficult since, for example, the process of wire cutting is hampered by the structure of the shape-optimized region located underneath. Machining is also made more difficult in the foot area.

The invention is therefore based on the object of eliminating the aforementioned disadvantages.

The independent claims are a first draft to describe the subject matter of the invention. Therefore, one or more of the features from the independent claims can be replaced or supplemented by one or more features from the disclosure or else deleted.

A punch unit of a powder press is proposed, wherein the punch unit is assembled from at least two parts, in this case comprising a headpiece as the first part and a widening region, adjoining the headpiece, as the second part, wherein the widening region flares to a diameter of a punch holder which can be attached directly to an end, located opposite the headpiece, of the widening region.

A development provides for the headpiece and the widening region to be produced from different materials with a different tolerance. A further development provides for the headpiece and the widening region to be produced from the same material with a different tolerance.

Preference is given to a punch unit in which the headpiece and the widening region are produced by means of different methods. It is also preferred that at least the widening region is produced by means of an additive method; the headpiece, on the other hand, has preferably been turned. In particular, the headpiece can be produced by cutting methods, by a casting method and/or by hard machining. Possible hard machining can be pressing or else surface rolling.

The use of different parts also permits a material selection to be freer. Thus, the headpiece and/or the foot piece can be made from a material which at present cannot yet be machined by means of additive production methods. The headpiece and/or the foot piece are preferably each produced from a steel material. The steel can be the same or different. A problem that is still present when carbon is used in a tool steel in the additive method can be the high stress that occurs, which is brought about during laser sintering. Provision is therefore made, for example, for the headpiece to be produced conventionally from a steel with high wear resistance and high ductility. For example, the headpiece is placed on the widening region by means of a connecting technique. For this purpose, types of connection such as adhesive bonding or else integral methods, sinter brazing, welding, casting in and/or sintering in can be used. The connection can also be produced by using form fitting or form/force fitting, for example by means of a press fit. A detachable connection is primarily designed to be non-destructive. Such a solution can, for example, comprise a form/force fit connection such as a bayonet catch or similar.

Furthermore, it is advantageous if the punch unit is built up in such a way that the headpiece is shorter than the widening region. A further embodiment provides for the widening region to have a material with a different modulus of elasticity than the material of the headpiece. The modulus of elasticity of the material of the headpiece is preferably higher than the modulus of elasticity of the material of the widening region. In relation to the foot piece, provision can be made, for example, for the modulus of elasticity of the material of the foot piece to be equal to or approximately equal to the modulus of elasticity of the headpiece. A further embodiment provides that the modulus of elasticity of the material of the foot piece can also be higher than that of the headpiece. The modulus of elasticity of the material of the widening region is preferably lower than the modulus of elasticity of the material of the foot piece and also of the modulus of elasticity of the material of the headpiece.

A development provides for the punch unit to comprise a foot piece which is attached to the widening section. It is in particular preferred if the headpiece and/or the foot piece are connected detachably or non-detachably to the widening section.

According to a further idea of the invention, which can stand on its own or in conjunction with the above ideas, punch units of a powder press that slide in one another are proposed, having a plurality of punch units, preferably as described above and also in more detail below. At least two of the punch units, preferably all the punch units, have a widening region which widens conically, in particular in the shape of a cone or bell. A further embodiment provides for the punches that slide in one another preferably to be provided with a different ratio of the length of the headpiece to the length of the widening section.

A development of the punch units that slide in one another provides that, in a common end position, the feet of the respective punch units preferably end at heights that differ from one another. A further embodiment provides that, in a common end position, the multi-part punch units end at least approximately, preferably exactly, at a common height and therefore in a common plane. Once more, provision can likewise be made for the punch units to have an approximately equal elasticity in comparison with one another. In this case, the widening region which lies between the headpiece and the foot piece is essential for the elasticity equalization. By means of this constructional shape and taking into account the modulus of elasticity of the material and of the elasticity sensor that results, an influence can be exerted on the rigidity and therefore on an elasticity behavior, particularly when relaxing from a compressed state.

A further embodiment provides, for example for the punch units that slide in one another, for the feet of the punch units to end in a common end position at the same height along a plane.

Furthermore, it is preferred if, in the punch units that slide in one another, an outermost punch unit compresses less than an inner punch unit. In particular as the load is relieved following a pressing of a powder material, this permits the load relief to be evened out, for example by means of a controlled or regulated movement of the respective punch units.

According to a further idea of the invention, which can act independently and also together with the above and following ideas, a powder press is proposed which has punch units that slide in one another. However, according to a further embodiment, this can not only be at least in two parts, as described above and also below. Instead, according to a further embodiment, provision can be made for a mixture of one-piece and two-part punch units to be provided. The two-part punch units are preferably as described above and below. The one-piece punch units are, for example, configured in a way as can be gathered from DE 10 2014 003 726 quoted above, to which reference in this regard is made within the context of the disclosure of the invention. A further embodiment provides for the powder press also to use only one-piece punch units comprising headpiece and widening region, wherein at least two such punch units have a widening region as described above and also below.

Once more, a further idea, which can act independently and also together with the above and following ideas, is a method for operating a powder press in which punch units that slide in one another, as described above and below, are used and operated, wherein monitoring in the form of control or regulation is used, which performs an equalization between different compressions of the punch units that slide in one another as a load on a pressed workpiece is relieved.

Within the context of the method, electronic compensation of the equalization is preferably carried out. For this purpose, one or more stress and/or displacement sensors, which are connected to a control device, can be used. By means, for example, of a stipulation with regard to displacement length differences between the individual punch units as a result of the geometry of the pressed component, the relief over all the punch units as the punch units are withdrawn can be evened out. As a result, fracture of the pressed green compact can be prevented.

In addition, according to the invention, a setup of a powder press with a set of punch units that slide in one another as described above and below is proposed, wherein said units are first inserted together and then set up jointly. This is an advantage as compared with the previous setup, since there each punch had to be inserted individually and then also set up individually. By means of the common setup, made possible by the construction of the proposed punch units, the downtime of the powder press is shortened considerably.

Further advantageous embodiments and developments can be gathered from the following figures. One or more features from one or more figures can together yield further embodiments, likewise also in conjunction with the above-described features of the invention. In particular, the figures are conceived only for the improved clarification of the invention but not to restrict the same. In the figures:

Figure 1:
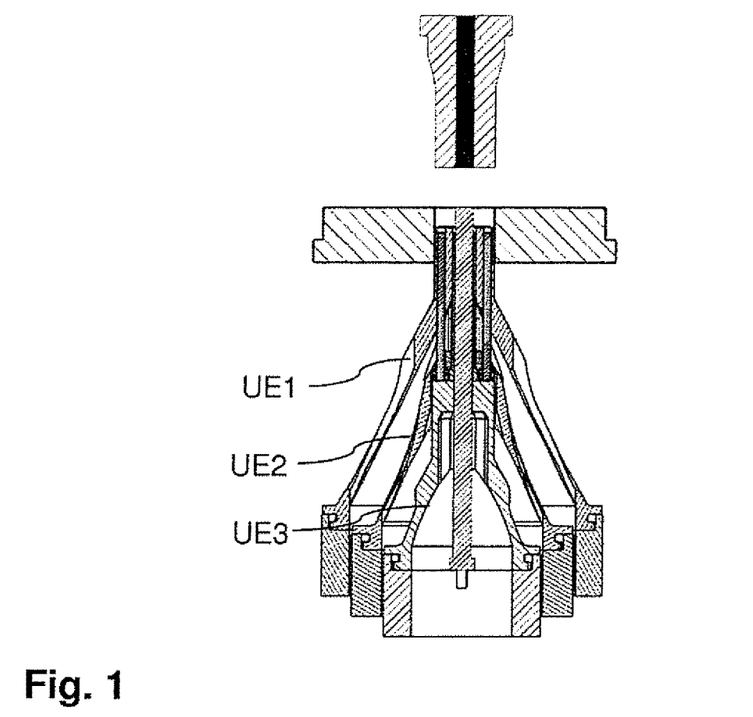
FIG. 1: shows an assembly drawing in half section of a tool structure comprising three lower punch units with shape-optimized regions, here only in the lower punch area; in the upper punch area, for example, use can be made of an upper punch which has no widening region as proposed.

FIG. 1 shows an assembly drawing in half section of a tool structure comprising three lower punch units UE1, UE2, UE2 with shape-optimized regions, here only in the lower punch area. By means of a connection technology, here in the form of a plug-in or clamping connection, a shape-optimized, virtually conical region is connected to standard tool components to form a lower punch unit. Furthermore, the lower punches here each have different height levels in the attachment to the punch holder. Such a stepped structure primarily has the purpose of being able to implement the travels more simply by means of the height graduation. This makes it possible to dispense with a vertical region in the punch unit which may otherwise possibly be necessary. Furthermore, a better force flow in the respective punch unit results.

Figure 2:
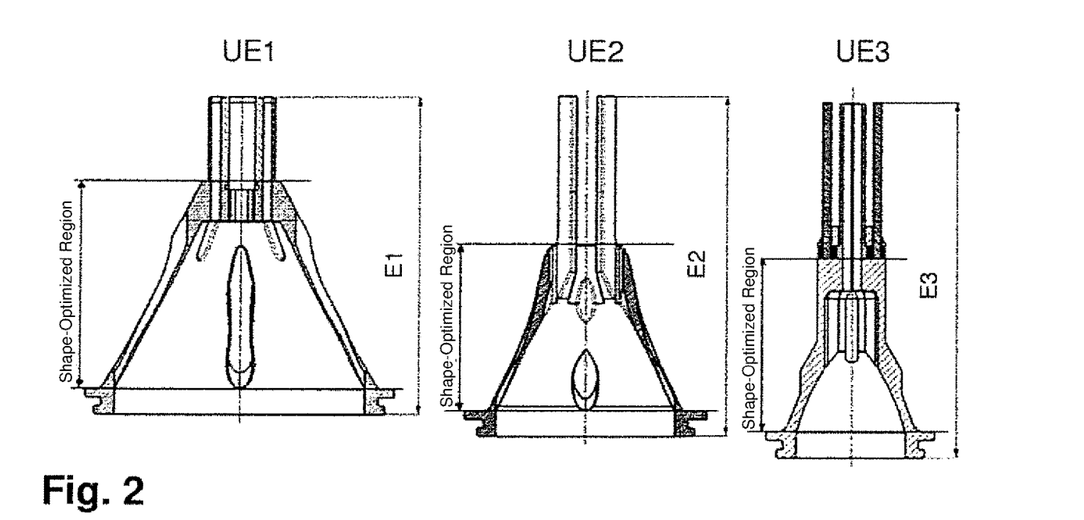
FIG. 2: shows a summary of all three lower punch units of the tool structure in a respectively different configuration.

FIG. 2 shows a summary of all three lower punch units of the tool structure. All the elasticities of the lower punch units UE1, UE2 and UE3 are preferably identical but in particular at least approximately equal. The differences which otherwise result from the different tool lengths are compensated by the shape-optimized region. The elasticities, here of the lower punch units, E1, E2, E3 are matched to one another, i.e. equal or virtually equal, depending on the technical necessity. The same is likewise feasible in the case of upper punch units.

Figures 3, 4:
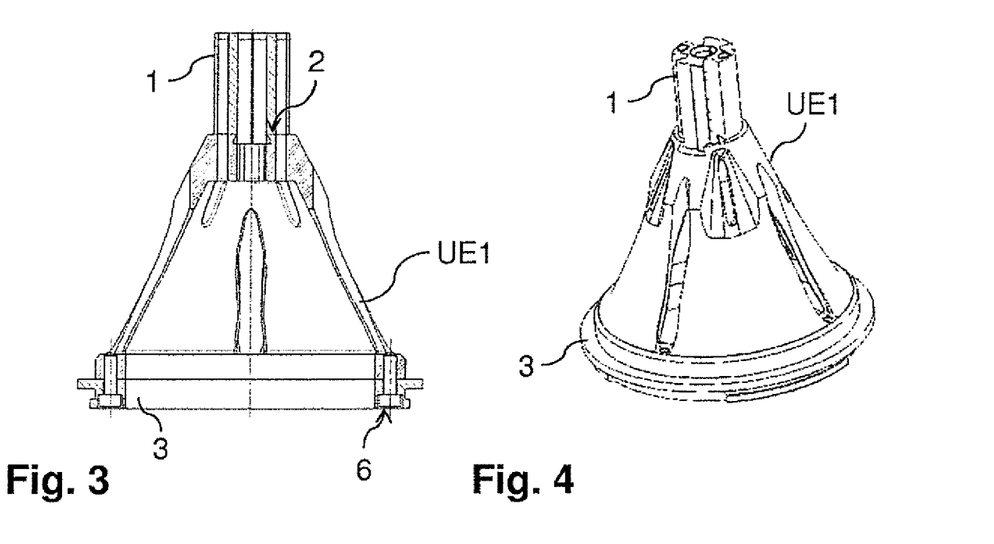
FIG. 3 and FIG. 4: show a headpiece with form-fitting connection and a foot piece with a screw connection.

FIG. 3 and FIG. 4 show a headpiece 1 with form-fitting connection 2 and a foot piece 3 with a screw connection 6. The punch unit illustrated thus comprises the punch headpiece, the shape-optimized tool extension and the screwed punch foot piece. The punch headpiece is independent in relation to a material selection and can be produced, for example, by means of an additive method. A cutting method and/or hard machining are preferred. By means of a form-fitting plug-in connection as connecting means, the shape-optimized extension region, which is preferably produced by an additive method, is connected to the punch headpiece to form a punch unit. The shape-optimized tool extension region is preferably provided with calculated elasticity equalization in relation to the other punch units, wherein for example the punch units are at different tool levels.

Figures 5, 6:
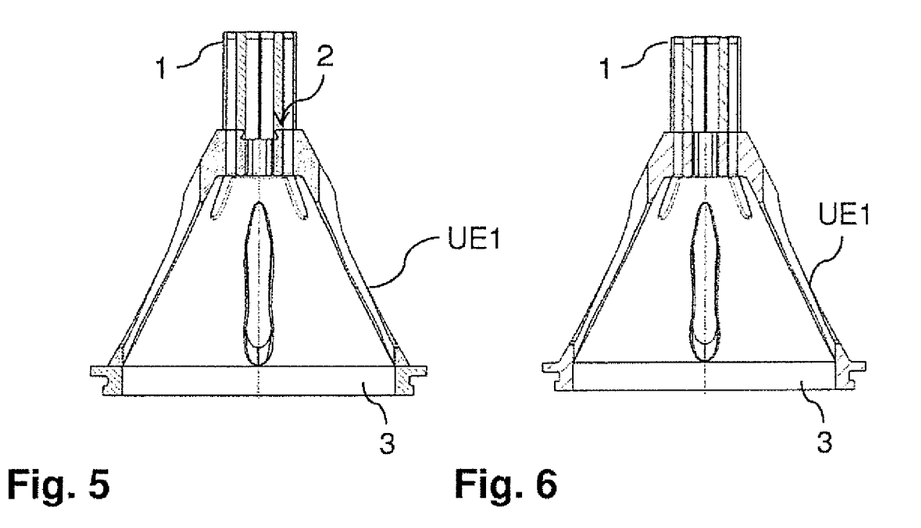
FIG. 5: shows a headpiece with form-fitting connection and shape-optimized region, connected to a conventionally fabricated foot piece by direct laser sintering.
FIG. 6: shows a shape-optimized region, connected to the conventionally fabricated headpiece by direct laser sintering.

FIG. 5 shows a headpiece 1 with form-fitting connection 2 and shape-optimized region, connected to a conventionally fabricated foot piece 3 by direct laser sintering. Here, too, a punch headpiece can be produced for example by means of an additive method, a cutting, shaping, in particular casting and/or hard-machining method such as pressing or rolling. There is likewise an independent material selection for this purpose. A connection between the shape-optimized extension region and the foot is produced here by direct laser sintering on the foot. The punch foot itself can likewise be produced from an extremely wide range of materials, likewise for example also fabricated by means of an additive method.

FIG. 6 shows a shape-optimized region, which is connected to a conventionally fabricated headpiece 1 by direct laser sintering. In this embodiment, the shape-optimized region is produced in one piece with the foot piece 3 by means of an additive fabrication method. The punch headpiece, on the other hand, has been produced separately therefrom as an individual part. A connection between the headpiece and the shape-optimized region is made here by means of direct laser sintering on the headpiece.

Figure 7:
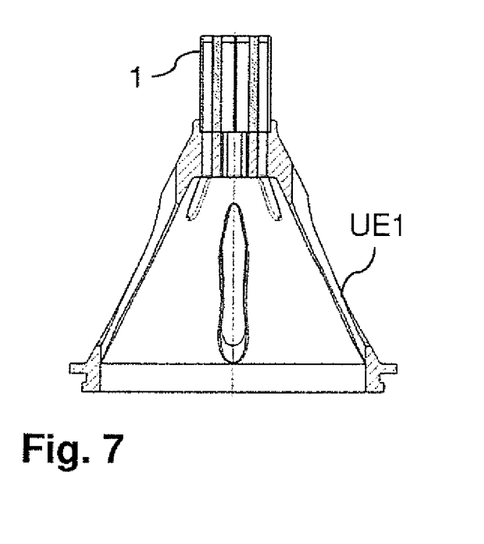
FIG. 7: shows a shape-optimized region, connected to the conventionally fabricated headpiece by brazing, for example.

FIG. 7 shows a shape-optimized region which, for example, is connected to the conventionally fabricated headpiece 1 by brazing. Here, too, the shape-optimized region is provided with the foot piece 3 as an additively fabricated unit.

Figure 8:
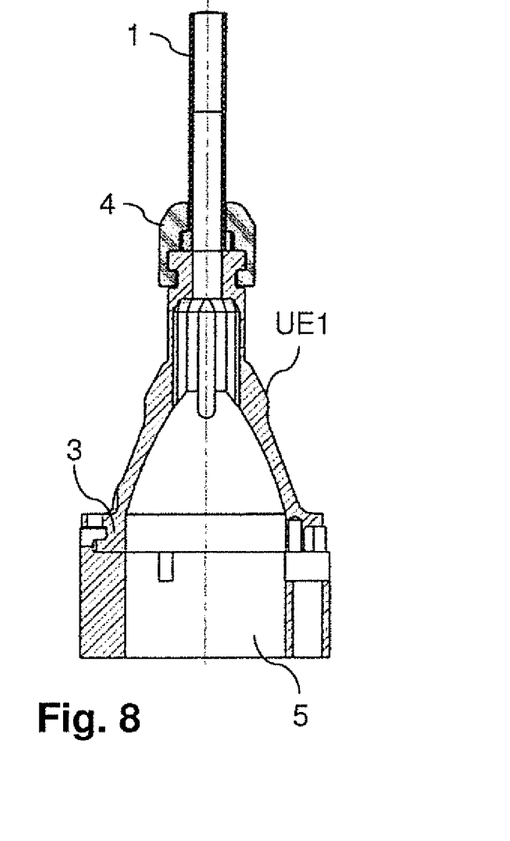
FIG. 8 and FIG. 9: show a shape-optimized region, connected to the conventionally fabricated headpieces, here three elements, by a clamping piece.
Figure 9:
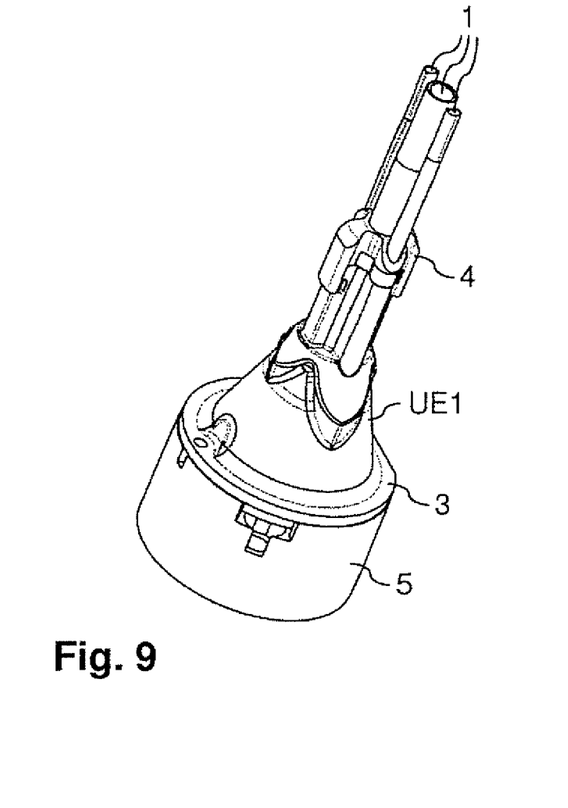

FIG. 8 and FIG. 9 show a shape-optimized region which is connected to the conventionally fabricated headpieces 1, here in the form of three elements, by a clamping piece 4. The punch unit comprises one or more punch headpieces, a connecting element in the form of a foot piece 3 and the shape-optimized tool extension. The shape-optimized tool extension region ensures the elasticity equalization between the punch units. Also attached to the shape-optimized tool extension at the bottom is the punch holder 5. The latter can be screwed on or else connected by means of a bayonet catch.

Figure 10:
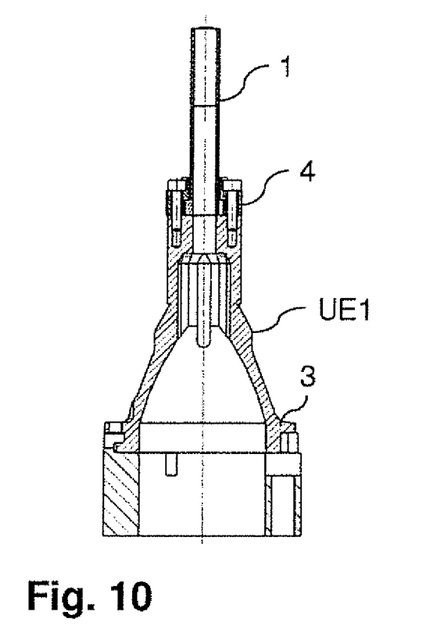
FIG. 10 and FIG. 11: show a shape-optimized region, screw-connected to the conventionally fabricated headpieces, here three elements, by a clamping piece.
Figure 11:
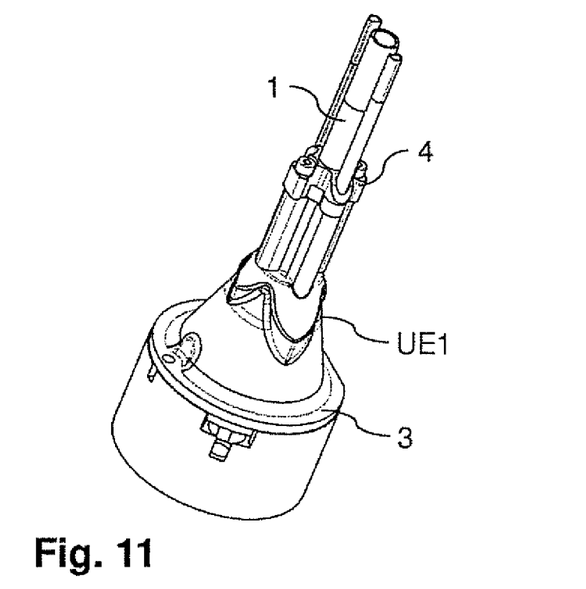

FIG. 10 and FIG. 11 show a shape-optimized region which is screwed to the conventionally fabricated headpieces, here three elements, through a clamping piece.

Figure 12:
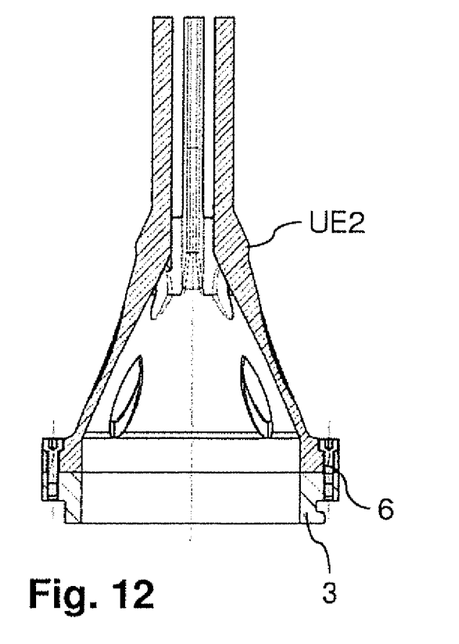
FIG. 12 and FIG. 13: show a foot piece with a screw connection.
Figure 13:
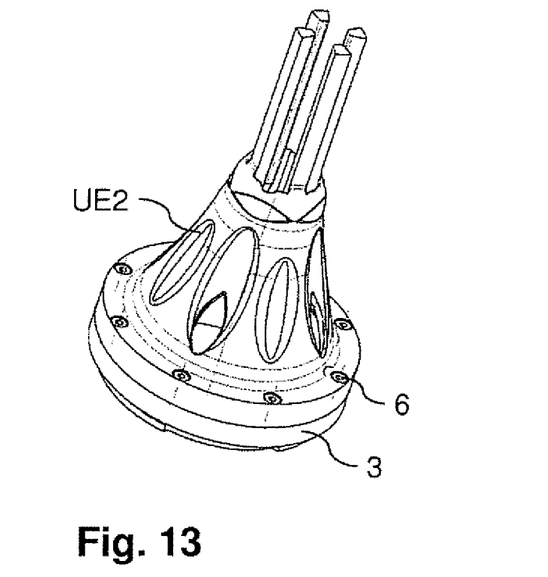

FIG. 12 and FIG. 13 show a foot piece 3 with a screw connection 6. The punch foot piece is screwed on by means of the latter.

Figure 14:
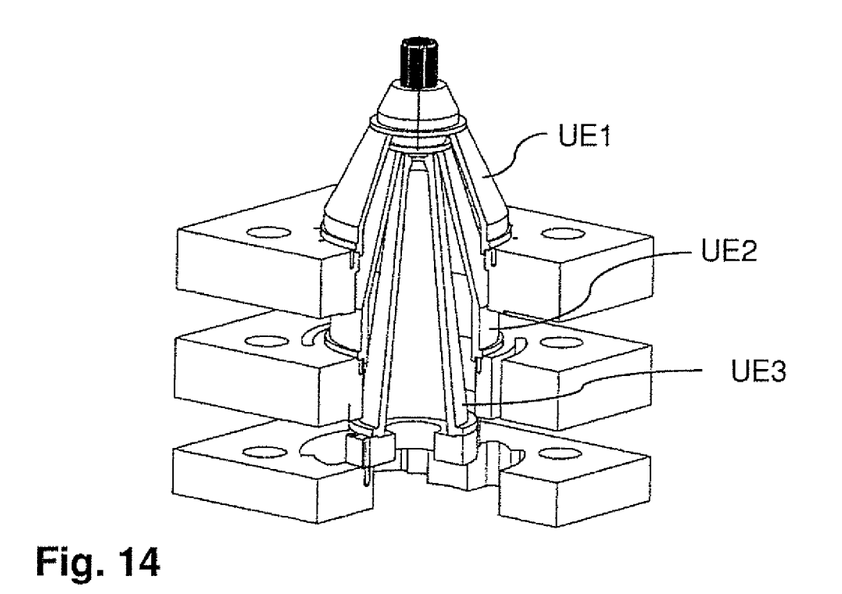
FIG. 14: shows a view of punch units that slide in one another.

FIG. 14 shows a view of punch units that slide in one another. In the view shown, the lower punches are self-supporting. This is only one possible configuration. Support can also be provided in another way.

Figure 15:
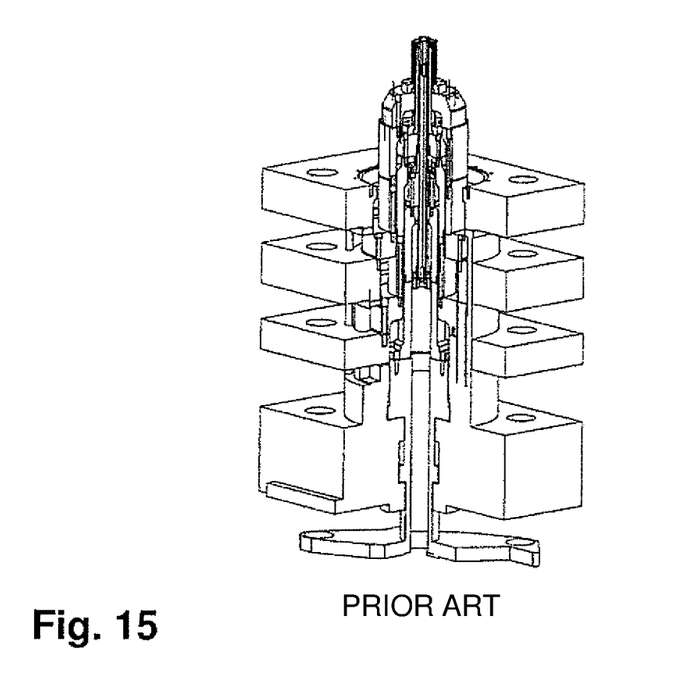
FIG. 15: shows a view of the known prior art with regard to a powder press.

FIG. 15 shows a schematic view of known prior art with regard to a powder press. As can be seen in comparison to FIG. 14 but also FIG. 1, this known solution is taller and does not permit this movement close to one another during setting up, as the solution now proposed permits.

The invention claimed is:

1. Punch units of a powder press that slide in one another, the punch units each comprising:
  at least two parts including:
    a headpiece as the first part, and
    a widening region, adjoining the headpiece, as the second part, wherein the widening region flares to a diameter of a punch holder adapted for direct attachment to an end, located opposite the headpiece, of the widening region wherein the widening region of at least two of the punch units widens conically;
  wherein the punch units have an approximately equal elasticity in which the punch units compress and relax by identical amounts under applied pressure from the powder press in comparison with one another with at least two of the modulus of elasticity, length, and constructional shape being different between the punch units.

2. The punch units that slide in one another as claimed in claim 1, wherein the headpiece and the widening region are produced from different materials with a different tolerance.

3. The punch units that slide in one another as claimed in claim 1, wherein the headpiece and the widening region are produced from the same material with a different tolerance.

4. The punch units that slide in one another as claimed in claim 1, wherein the headpiece and the widening region are produced by different methods.

5. The punch units that slide in one another as claimed in claim 4, wherein the widening region is produced by an additive method and the headpiece is produced by a cutting, casting and/or a hard-machining method.

6. The punch units that slide in one another as claimed in claim 1, wherein the headpiece is shorter than the widening region.

7. The punch units that slide in one another as claimed in claim 1, wherein the punch units each comprise a foot piece which is attached to the widening region.

8. The punch units that slide in one another as claimed in claim 1, wherein the headpiece and/or the foot piece is connected detachably or non-detachably to the widening region.

9. The punch units that slide in one another as claimed in claim 1, wherein the punch units that slide in one another are provided with a respectively different ratio of the length of the headpiece to the length of the widening region.

10. The punch units that slide in one another as claimed in claim 1, wherein in a common end position, the feet of the respective punch units end at heights that differ from one another.

11. The punch units that slide in one another as claimed in claim 1, wherein in a common end position, the feet of the punch units end at the same height along a plane.

12. The punch units that slide in one another as claimed in claim 1, wherein an outermost punch unit compresses less than an inner punch unit.

13. A powder press having punch units that slide in one another as claimed in claim 1.

14. A method for operating a powder press, in which punch units that slide in one another as claimed in claim 1 are operated, wherein monitoring in the form of control or regulation is used, which performs an equalization between different compressions of the punch units that slide in one another as a load on a pressed workpiece is relieved.

15. The method as claimed in claim 14, wherein electronic compensation of the equalization is carried out.

16. A setup of a powder press with a set of punch units that slide in one another as claimed in claim 1, wherein said units are first inserted together and then set up jointly.

17. The punch units that slide in one another as claimed in claim 5, wherein the headpiece is produced by turning and/or pressing.

18. The punch units that slide in one another as claimed in claim 7, wherein the foot piece is attached to the widening region by a bayonet catch.

19. The punch units that slide in one another as claimed in claim 1, wherein the punch units have elasticities which are identical in comparison with one another.

\* \* \* \* \*